No. 831,428. PATENTED SEPT. 18, 1906.
J. GUIRY.
DUMPING CART.
APPLICATION FILED SEPT. 30, 1905.
2 SHEETS—SHEET 1.
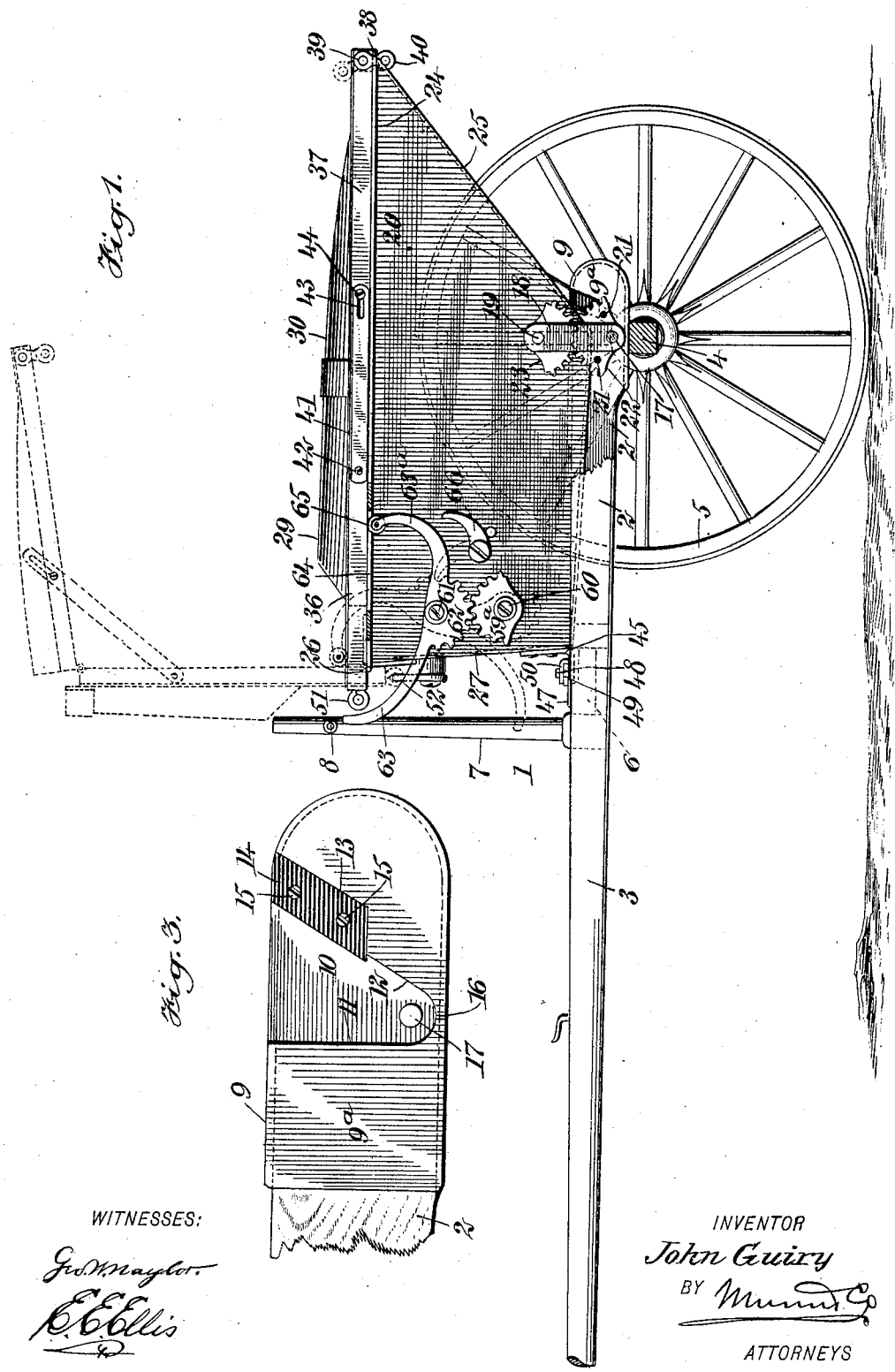
WITNESSES:
INVENTOR
John Guiry
BY
ATTORNEYS No. 831,428. PATENTED SEPT. 18, 1906.
J. GUIRY.
DUMPING CART.
APPLICATION FILED SEPT. 30, 1905.
2 SHEETS—SHEET 2.
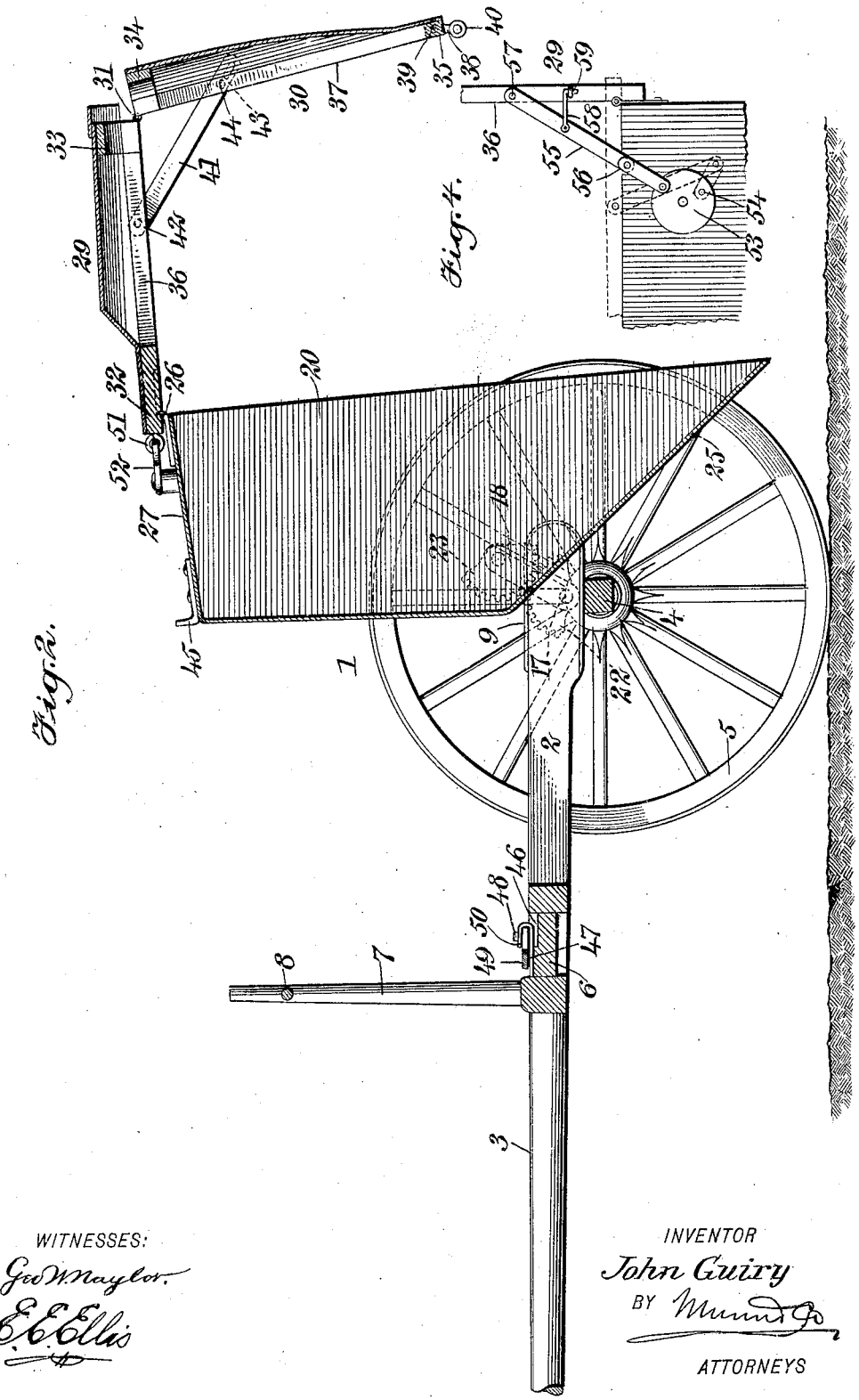
WITNESSES:
Geo W Naylor
E. E. Ellis
INVENTOR
John Guiry
BY Munn & Co
ATTORNEYS

UNITED STATES PATENT OFFICE.

JOHN GUIRY, OF NEW YORK, N. Y.

DUMPING-CART.

No. 831,428.     Specification of Letters Patent.     Patented Sept. 18, 1906.

Application filed September 30, 1905. Serial No. 280,795.

*To all whom it may concern:*

Be it known that I, JOHN GUIRY, a citizen of the United States, and a resident of the city of New York, borough of Manhattan, in the county and State of New York, have invented a new and useful Improvement in Dumping-Carts, of which the following is a full, clear, and exact description.

This invention relates to dumping-carts; and it consists, substantially, in the details of construction and combinations of parts hereinafter more particularly described and pointed out in the claims.

One of the principal objects of the invention is to provide a dumping-cart of an embodiment to overcome numerous disadvantages and objections encountered in the use of many other structures of the kind hitherto devised.

A further object is to provide a dumping-cart which is simple in construction and comparatively inexpensive to manufacture, besides being thoroughly effective and reliable in use and possessing the capacity for long and repeated service.

The above and additional objects are attained by means substantially such as are illustrated in the accompanying drawings, in which—

Figure 1 is a broken side view, in part section, of a dumping-cart embodying my improvements, the dotted lines indicating the cover for the cart in raised position. Fig. 2 is a longitudinal sectional view showing the body of the cart in its dumped position. Fig. 3 is an enlarged view in detail, illustrating one of the cushions against which the weight of the body of the cart and its load is received at the time of dumping the cart; and Fig. 4 is also an enlarged view in detail, illustrating the jointed brace for the cover of the cart when in raised position.

Before proceeding with a more detailed description it may be stated that in the form of my improvements herein shown I employ a dumping-cart having a body of special construction, together with a specially-constructed cover therefor and special means for raising the same to enable the cart to be dumped of its contents whenever desired. Special means are also employed for sustaining the cover of the cart in its raised position and for preventing the cover from being carried or thrown beyond a determinate position forwardly of the structure, and while I have herein represented my improvements in a certain preferred embodiment it will be understood, of course, that I am not limited thereto in precise detail, since immaterial changes therein may be made coming within the scope of my invention.

Reference being had to the drawings by the designating characters thereon, 1 represents my improved structure in entirety, the same comprising parallel side bars 2, terminating forwardly in shafts 3 for a draft-animal and being connected together at or near the rear ends thereof by means of an axle 4, at the ends of which are the supporting-wheels 5 for the structure. The side bars 2 are also connected together by means of a sill 6, located the desired distance from the said rear ends thereof, and mounted on the sill are parallel upright members 7, connected together near the upper ends thereof by means of a rod 8.

The rear end of each side bar 2 is preferably provided with a strengthening-iron 9, having an inner side $9^a$, formed with a slot 10, (see Fig. 3,) having a straight vertical wall 11 and an upwardly and rearwardly inclined wall 12, the latter being formed with a notch 13, having seated therein a suitable cushioning device or buffer 14, as a block of rubber, for instance, removably secured in place in any suitable way, as by means of screws 15, entering the side bar. The said walls 11 and 12 of each slot 10 intersect with each other at 16, thus closing the slot at its lower end, the upper and wider end thereof being open, as shown. Extending into each slot near the said lower end thereof is a boss or projection 17 from the corresponding side bar 2, on which boss is movably applied the lower end of a swing-bar or plate 18, the upper end of which has movable connection with a pin 19, projecting from the adjacent or corresponding side of the body 20 of the cart, as shown. Secured across each slot 10, as by means of screws 21, is a toothed sector 22, while secured to each side of the said body 20 of the cart, as by means of the appropriate pin 19, is another toothed sector 23, the teeth of two said sectors engaging with each other in the movements imparted to the body to dump it and to restore it to position.

The body 20 of the cart is substantially rectangular in shape, the sides thereof being parallel and each provided at its upper edge with a laterally-projecting rail 24, while the rear end 25 thereof occupies a rearward upward inclination in the normal or upper position of the body, this construction facilitating the discharge of the load from the body when the latter is carried to dumping position, as is apparent.

Hinged at 26 to the upper edge of the front 27 of the body 20 of the cart is a cover constructed of sections 29 and 30, hinged together at 31 and comprising strengthening-frames made up of the transverse members 32 and 33 and 34 and 35, respectively, together with longitudinal members 36 and 37, respectively, at the side edges thereof, the latter being provided at their rear ends at the sides with arms 38, pivoted at 39 and carrying rollers 40, which may be swung beneath the rear ends of the said rails 24 when the cover is closed or down, as indicated in Fig. 1, thus to secure said cover in this position. The sections 29 and 30 of the cover are connected with each other by means of links 41, each having an end thereof pivoted at 42 to the side of one of the longitudinal frame members 36 of the section 29, its other end having therein a slot 43, in which works a pin 44 from the side of the corresponding longitudinal frame member 37 of the section 30 of the cover, as shown. The said front 27 of the body 20 is provided with a foot 45, which when the body 21 is in the position indicated in Fig. 1 is received in a notch or recess 46 therefor in the sill 6, around which is suitably secured a latch-plate 47, to which is pivoted at 48 a latch 49, adapted to be turned beneath a forwardly-bent member 50 of said latch-plate and across the said foot 45, and thus lock or secure the body in this position in an obvious manner.

The forward edge of the transverse frame member 32 of the section 29 of the cover of the cart is preferably provided with an eye 51 and the front 27 of the body with a hook 52, adapted for engagement with the eye to secure the cover of the body in the open position thereof, (indicated in dotted lines in Fig. 1 and in full lines in Fig. 2,) and preferably I sometimes employ means for assisting in maintaining the cover in open position, as well as for relieving the same and the hinges thereof from strain at times when the body of the cart is dumped. Thus, Fig. 4, I provide the body 20 at one side near the front thereof with a rotatable disk 53, carrying a crank-pin 54, to which is loosely connected one end of a brace 55, which is jointed at 56, and the other end of which is in movable connection with a pin 57, projecting from the side of the corresponding longitudinal member 36 of the section 29 of the cover 20, said brace being provided with a hook 58, which may be placed in engagement with an eye 59 on the said member 36 whenever the said cover is carried to open position. On referring to Fig. 2 it will be noted that the longitudinal dimension of the body 20 is such that the rear end thereof cannot strike the ground when the cart is dumped, this being a preferred construction to prevent the body from being bent or distorted, it being here mentioned that both the said body and its cover are preferably constructed of metal.

To effect the lifting or raising of the cover from the said body 20 of the cart, I preferably employ a toothed sector $59^a$, rotatably supported at 60 on one side of the body 20 near the front thereof, while rotatably supported at 61, just above said sector $59^a$, is another toothed sector 62, engaging therewith and provided with a curved operating-lever 63, extending forwardly of the cart, and a curved lifting-arm $63^a$, extending rearwardly of the cart, as shown, and adapted to be raised and lowered within a guiding-slot 64 therefor formed in the adjacent one of the lateral rails 24 of the body, (see Fig. 1,) said lifting-arm being provided at its end with a roller 65, located at the under side of the corresponding longitudinal member 36 of the section 29 of the cover. Pivoted alongside the said sectors is a pawl 66, the free end of which may be carried into engagement with the said sector 62 to secure the cover in its raised position, as will be understood.

From the foregoing it will be seen that whenever it is desired to raise the cover of the cart it is simply necessary for the operator to depress the operating-lever 63, which action causes the lifting-arm $63^a$ to be carried upwardly, and consequently the cover will be raised by movable contact of the said roller 65 with the under side of the longitudinal frame member of the cover under which the same is located. During the raising of the cover the jointed brace 56 will straighten out, as permitted by the rotatability of the disk 53, and when fully raised the cover may be secured in position by the hereinbefore-mentioned device for that purpose. The upright members 7 constitute abutments for the cover, preventing the same from being carried too far forwardly of the body and also partly sustaining or bracing the same while in open position in virtue of the fact that portions of the cover practically rest upon the upper ends of said members. When the body is released and dumped, the swing-bars 18 will be caused to move rearwardly in the slots 10 therefor, while at the same time the sector 23 at each side of the cart will roll over the sector 22 corresponding therewith, and the greater part of the shock or strain to which the structure may be thus subjected will be received upon the hereinbefore-mentioned cushioning devices 14. Before starting to raise the cover the arms 38 are swung to carry the rollers 40 from beneath the ends of the rail 25, of course said rollers being then allowed to rest upon the upper surfaces of said rails, upon which they travel for a short distance before the rear edge of the cover is entirely lifted from said rails by continued pressure on the lever 63, and the sector 59ª will prevent to a great extent undue pressure of the lever on its pivot and will make the operation of the lever easy.

Having thus described my invention, I claim as new and desire to secure by Letters Patent—

1. A dumping-cart comprising side bars having strengthening-irons at their rear ends, formed with corresponding slots in the inner sides thereof, having forward vertical walls and rearwardly and upwardly inclined rear walls, with pins extending into the slots from said side bars, swing-bars mounted on said pins, sectors secured across the slots, a body mounted on the side bars, and sectors on the body having movable engagement with said first-named sectors.

2. A dumping-cart comprising side bars, a body thereon having a cover hinged to the front thereof, a sill connecting said bars, and an abutment for the cover mounted on the sill.

3. A dumping-cart comprising side bars, a body thereon having a cover hinged to the front thereof, a sill connecting said bars, and upright members on the sill against which the cover abuts when it is raised.

4. A dumping-cart comprising a body having parallel sides provided at their upper edges with lateral rails, and a cover for the body, hinged at the forward end thereof and constructed of sections hinged together, the rearmost section being provided at the free corners thereof with movable arms carrying rollers adapted to be turned beneath said rails at the rear ends of the latter.

5. A dumping-cart comprising a body having parallel sides provided at their upper edges with lateral rails, and a cover for the body, hinged at the forward end thereof and constructed of sections hinged together, the rearmost section being provided at the free corners thereof with movable arms carrying rollers adapted to be turned beneath said rails at the rear ends of the latter, said sections being movably connected by links.

6. A dumping-cart comprising a body having parallel sides provided at the upper edges thereof with lateral rails, one of which is formed with a slot, a cover for the body, hinged to the front thereof and constructed of sections hinged together, and means working through said slot for raising said cover.

7. A dumping-cart comprising a body having parallel sides provided at the upper edges thereof with lateral rails, one of which is formed with a slot near its forward end, a cover for the body, hinged to the front thereof and constructed of sections hinged together, and engaging toothed sectors on the side of the body beneath the slot, one of which is provided with an operating-lever and a lifting-arm for the cover working through said slot.

8. A dumping-cart comprising a body having parallel sides provided at the upper edges thereof with lateral rails, one of which is formed with a slot near its forward end, a cover for the body, hinged to the front thereof and constructed of sections hinged together, and engaging toothed sectors on the side of the body beneath the slot, one of which is provided with an operating-lever and a lifting-arm for the cover working through said slot, the end of said arm being provided with a roller.

9. A dumping-cart comprising a body provided with a hinged cover constructed of sections hinged together, a rotatable disk on one side of the body, having a crank-pin, and a jointed brace having movable connection with said pin and with one side of one of the sections of the cover.

In testimony whereof I have signed my name to this specification in the presence of two subscribing witnesses.

JOHN GUIRY.

Witnesses:
  PATRICK HIGGINS,
  LOUIS J. MOSBACH.